United States Patent
Rachal

(10) Patent No.: US 9,779,616 B1
(45) Date of Patent: Oct. 3, 2017

(54) SYNCHRONIZED MULTIFOCAL EMERGENCY ALERT SYSTEM

(71) Applicant: Frank G. Rachal, Manassas, VA (US)

(72) Inventor: Frank G. Rachal, Manassas, VA (US)

( * ) Notice: Subject to any disclaimer, the term of this patent is extended or adjusted under 35 U.S.C. 154(b) by 0 days.

(21) Appl. No.: 15/606,817

(22) Filed: May 26, 2017

Related U.S. Application Data

(63) Continuation-in-part of application No. 14/956,343, filed on Dec. 1, 2015, now Pat. No. 9,666,062.

(51) Int. Cl.
*G08B 25/01* (2006.01)
*G01S 19/13* (2010.01)

(52) U.S. Cl.
CPC ............ *G08B 25/016* (2013.01); *G01S 19/13* (2013.01)

(58) Field of Classification Search
CPC .......... A61B 2017/00734; B66C 13/18; B66C 13/22
See application file for complete search history.

(56) References Cited

U.S. PATENT DOCUMENTS

| 6,270,916 | B1 | 8/2001 | Sink et al. |
| 7,586,289 | B2 | 9/2009 | Andruk et al. |
| 8,086,306 | B2 | 12/2011 | Katzman et al. |
| 2004/0113780 | A1 | 6/2004 | Pottratz |
| 2012/0001750 | A1* | 1/2012 | Monroe ................. A61B 50/30 340/539.11 |
| 2012/0312247 | A1 | 12/2012 | Ebersole |
| 2014/0361895 | A1 | 12/2014 | Smith |
| 2015/0117948 | A1 | 4/2015 | Carlson |
| 2015/0258315 | A1 | 9/2015 | Chandler et al. |

FOREIGN PATENT DOCUMENTS

GB 2492091 A 12/2012

OTHER PUBLICATIONS

"Weatherproof Personal Alarm with Rip Cord Activation and Attachment Utility Strap," Amazon website.
"Personal locator beacon (PLB)," Nautic Expo website.

* cited by examiner

*Primary Examiner* — Kabir A Timory
(74) *Attorney, Agent, or Firm* — Richard C. Litman

(57) ABSTRACT

The synchronized, multifocal emergency alert system may include a device/emergency kit container, or may be incorporated into a belt, harness, or other personal protective equipment. The system may include a zipper slider, a zipper, access tab, alert device, and non-conductive pull tab. When the non-conductive pull tab is pulled, the alert device is triggered, and the synchronous, multifocal system alerts monitors that an emergency situation has occurred involving traumatic injury and alerting the monitors of the location of the emergency situation.

9 Claims, 4 Drawing Sheets

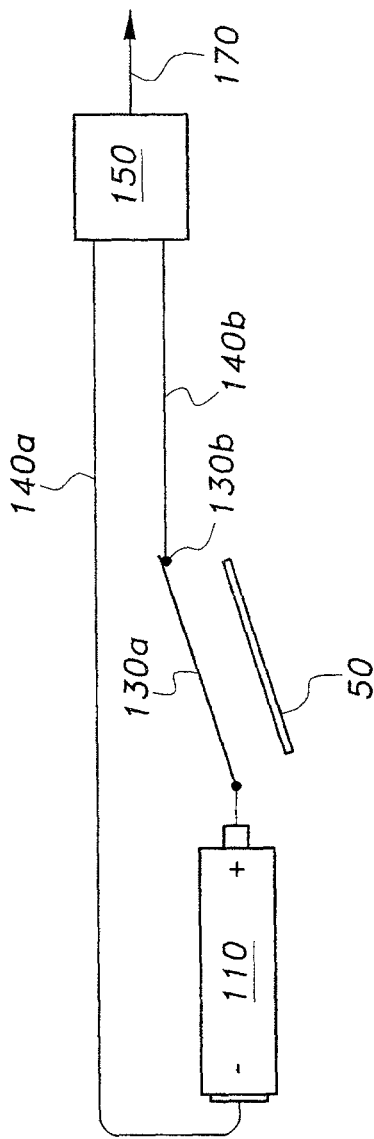
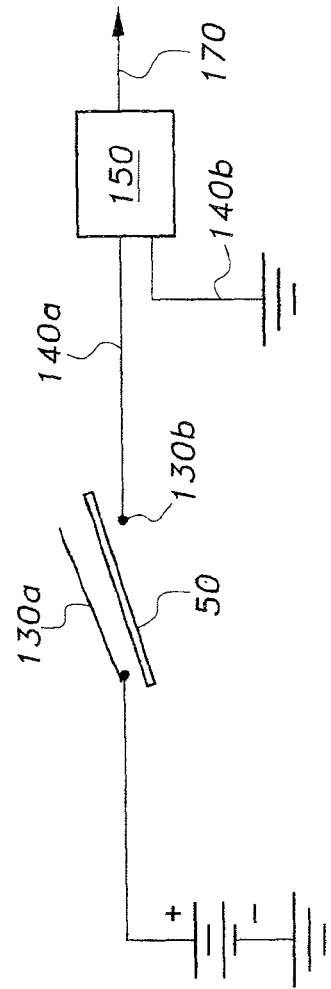
Fig. 2A
Fig. 2B

US 9,779,616 B1

SYNCHRONIZED MULTIFOCAL EMERGENCY ALERT SYSTEM

CROSS-REFERENCE TO RELATED APPLICATIONS

This application is a continuation-in-part of my prior application Ser. No. 14/956,343, filed Dec. 1, 2015, now U.S. Pat. No. 9,666,062.

BACKGROUND OF THE INVENTION

1. Field of the Invention

The present invention relates to emergency alert devices and systems, and more particularly to a synchronized, multifocal emergency alert system that provides a switch-actuated emergency alert device for providing or summoning assistance to a multitude of persons or locations or events.

2. Description of the Related Art

Trauma, regardless of its source (gunshots, stabbings, serious falls, car accidents, natural disasters, etc.) is the leading cause of death among Americans under the age of forty-five, accounting for more fatalities than illness and infectious disease combined. Emergency first responders have developed a protocol to handle traumatic injuries, which includes early recognition, early treatment, and quick access to a medical facility. In particular, the time required to summon an emergency first responder to the scene of a traumatic injury is critical. The survival rate in traumatic injuries is substantially related to emergency response time. A few minutes may make the difference between life and death. While various systems have been developed for summoning assistance to the elderly who live alone, such systems are often geographically circumscribed to the person's home and require verbal communication with an intermediary security or monitoring service to determine the nature of the situation for which assistance is needed. A faster alert system that can accommodate younger individuals and is flexible enough for use in outdoor emergencies or activities, regardless of location, is needed.

Thus, a synchronized, multifocal emergency alert system solving the aforementioned problems is desired.

SUMMARY OF THE INVENTION

The synchronized, multifocal emergency alert system may include a device/emergency kit container, or may be incorporated into a belt, harness, or other personal protective equipment. The system may include a zipper slider, a zipper, access tab, alert device, and non-conductive pull tab. When the non-conductive pull tab is pulled, the alert device is triggered, and synchronously alerts monitors that an emergency situation has occurred involving traumatic injury and alerting the monitors of the location of the emergency situation. A preferred alert system may include a synchronized, multifocal alert system. Specifically, when the non-conductive pull tab is pulled, the alert device is triggered, and alerts multiple monitors with multiple information about the emergency situation.

These and other features of the present invention will become readily apparent upon further review of the following specification and drawings.

BRIEF DESCRIPTION OF THE DRAWINGS

FIG. 2A is an exemplary schematic diagram an electronic circuit of an alert device for an emergency alert system according to the present invention, showing the switch closed to activate the alert.

FIG. 2B is an exemplary schematic diagram of the electronic circuit of FIG. 2A, showing the switch open to inactivate the alert.

Similar reference characters denote corresponding features consistently throughout the attached drawings.

DETAILED DESCRIPTION OF THE PREFERRED EMBODIMENTS

Figure 1:
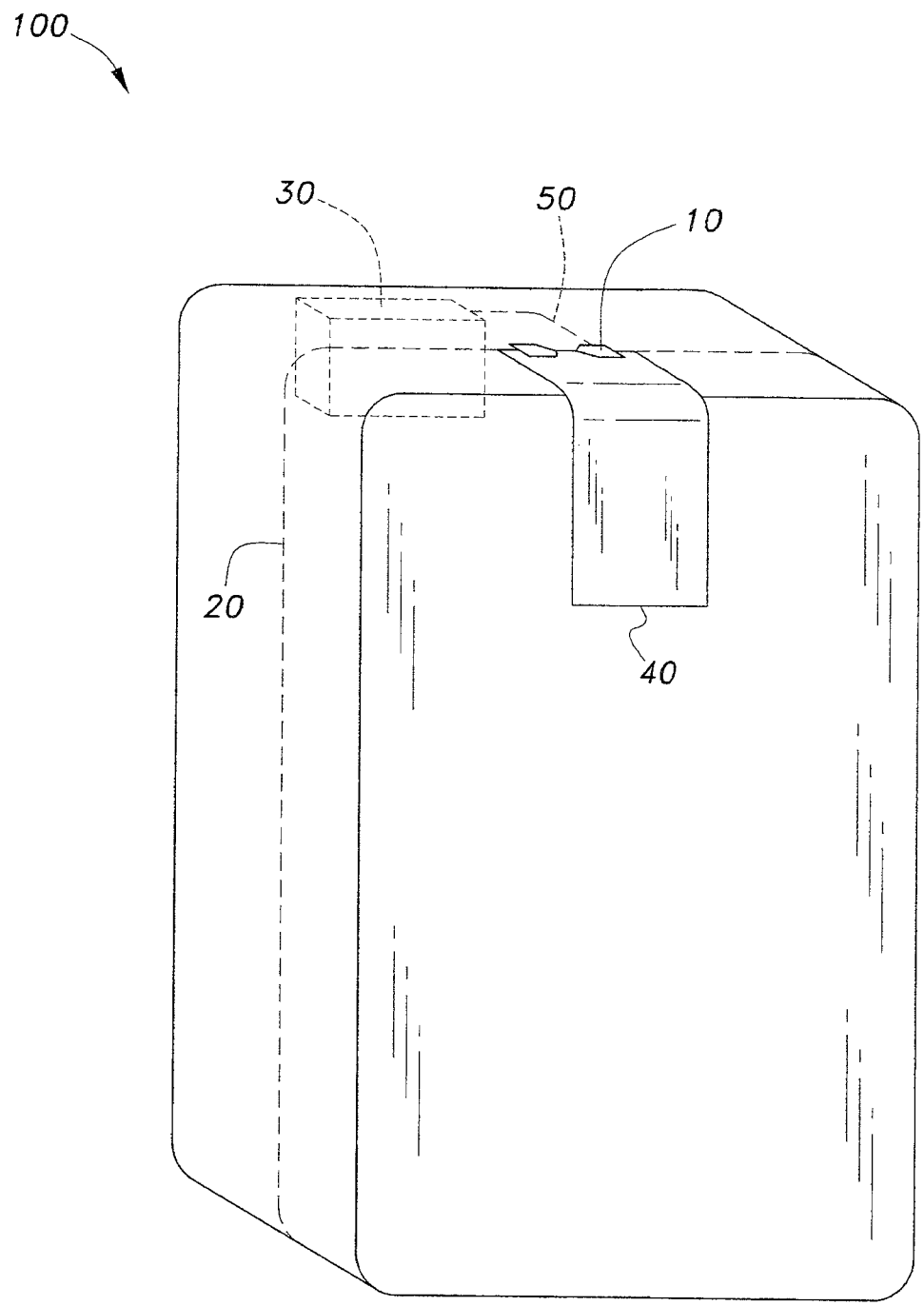
FIG. 1 is an environmental, perspective view of an exemplary embodiment of an emergency alert system according to the present invention.

The synchronized, multifocal emergency alert system 100 (an example of which is shown in FIG. 1) may include a device/emergency kit container that includes a zipper slider 10, a zipper 20, access tab 40, alert device 30 and non-conductive pull cord and tab 50.

As shown in FIGS. 2A and 2B, a battery-operated circuit may include a battery 110 having its negative terminal connected to a first lead 140*a* and a spring biased switch throw 130*a*. A switch pole 130*b* is connected to a second lead 140*b*. The first and second leads 140*a* and 140*b* are connected to a device 150 that is actuated when the battery-operated circuit is closed. The non-conductive combination pull cord and tab 50 (hereafter "tab") is removably disposed between the switch throw 130*a* and pole 130*b*, thus keeping the circuit open until the non-conductive pull tab is pulled away from the switch throw 130*a* and switch pole 130*b* mechanism. The open configuration of the battery operated circuit is shown in FIG. 2B, where the pull tab 50 is disposed between the switch throw 130*a* and the switch pole 130*b*.

The closed configuration of the battery operated circuit is shown in FIG. 2A, where the pull tab 50 is removed from the switch mechanism (spring-biased switch throw 130*a* and switch pole 130*b*). In this configuration, the circuit is closed and the device 150 is actuated to send a signal over line 170. For example, the spring-biased switch can be attached to a sensor which is automatically triggered whenever an event exceeds a predetermined threshold. Sensors can be triggered by, for example, physical trauma caused by impact or force or inertial movements coupled with accelerometers or if heat, smoke, chemical situations are sensed and exceed a threshold setting. These events are meant to be explanatory/exemplary rather than limiting. One of skill in the art can recognize the usage of cardiac sensor switches, neurotransmitter sensors. Thus, the spring-biased electrical switch can be considered to be an automatic synchronized multifocal circuit that is activated whenever an event exceeds a predetermined threshold.

When the battery-operated circuit is activated, it sends out an emergency signal over signal line 170 to a remote location, such as a central station, police station, paramedic service or other emergency responders. The emergency signal may also include identifying information about the location of the emergency using conventional circuitry, such as a global positioning system (GPS), or may transmit a beacon that can be triangulated. The emergency signal or beacon may be modulated with a message, either digital or analog, signifying that trauma has occurred and emergency response is required. In the event that the alert device incorporates a GPS receiver, the circuit may be configured so that the battery continuously supplies power to the GPS receiver, the switch being interposed between the battery and the alert transmitter, beacon, or transponder. The signal 170 may be transmitted using a radio that generates an RF signal, a cell phone signal, or other known communication signals.

The pull tab 50 may be attached to the door of an emergency response kit, such that the circuit is activated when the door of the kit is opened. Alternatively, the pull tab 50 may be attached to the door of a compartment built into the housing of the kit or attached to a zipper of a pocket that houses the alert device and is attached to the kit, so that the kit may be opened without activating the alert device when needed to treat minor abrasions that do not require emergency response. In another alternative, the pull tab 50 may be directly pulled by a user if the circuit is mounted on a wearable article, such as a harness, belt or other piece of apparel.

Figure 3:
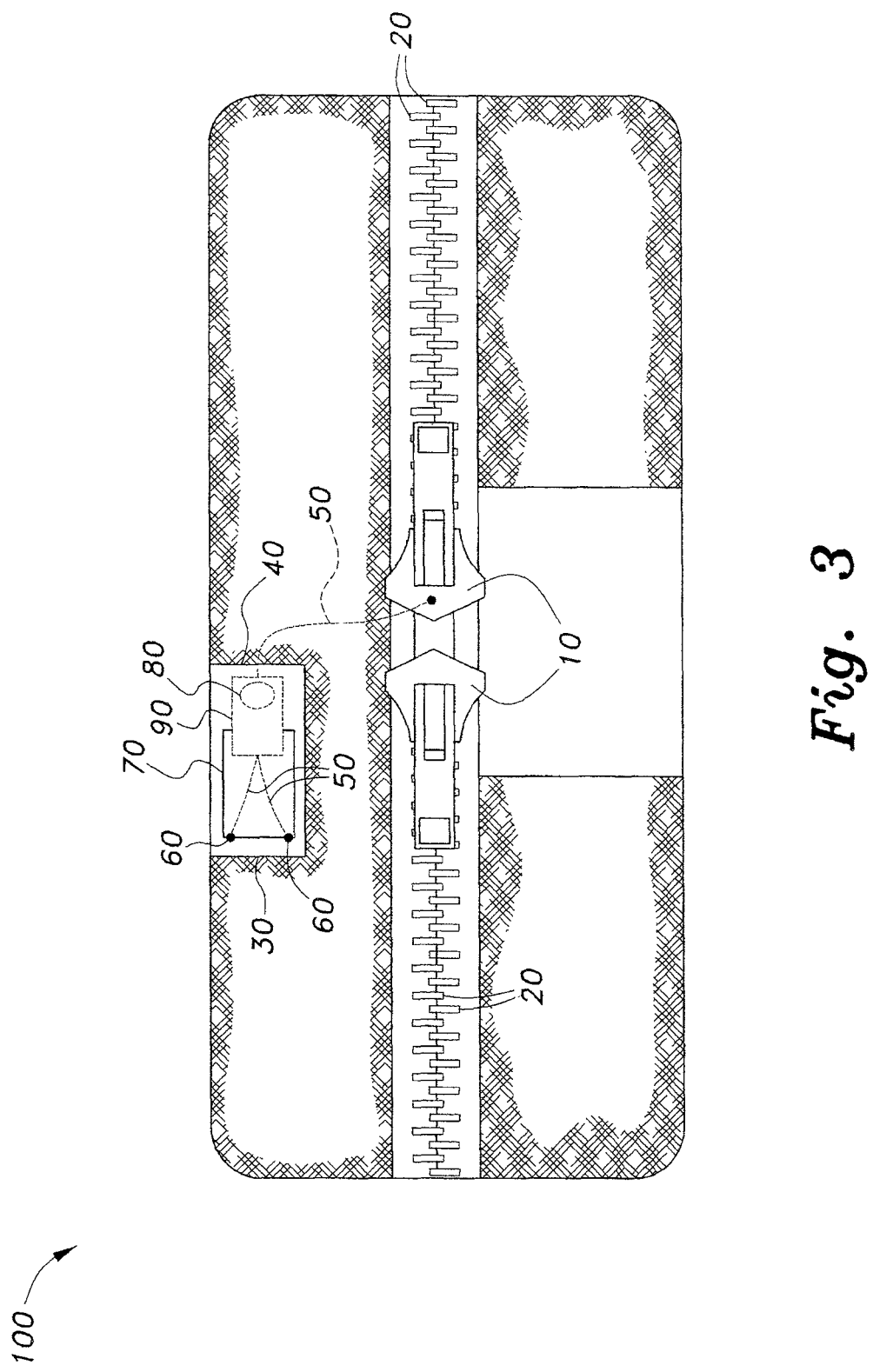
FIG. 3 is a top view of an alternative embodiment of an emergency alert system according to the present invention.

In the embodiment shown in FIG. 3, attachment points 60 are disposed on a device 70. A pull tab 50 is attached to the attachment points 60 and is tied to a left side of a guide 90 for a pre-staged power source 80. The pull tab 50 resumes and is attached to a right side of guide 90, extending to a zipper slider 10, and is hooked up to the device 70 via the continued portion of the pull tab 50. When the zipper travels along the zipper 20, the pull tab travels with the zipper slider 10, pulling the guide 80, thereby allowing the pre-staged power source 80 to close a circuit, such as the circuit shown in FIGS. 2A and 2B. Thus, the spring-biased switch throw 130a and switch pole 130b becomes a synchronized, multifocal alert system, as further discussed below.

The synchronized, multifocal emergency alert system 100 can function as a multifocal trauma indicating system. The "multifocal" nature of the system/device may identify that an individual has sustained a trauma injury and that time is of the essence. The device 150 may be registered, and once activated, emits a signal via signal line 170 to an emergency communications center or tactical operations command. (In one embodiment, it is up to command or an emergency communications officer to send an alert out for emergency responders). It is recognized that the pull tab 50 can be configured to be automatically deployed if a situation impedes its controllable threshold. For example, pressure, temperature, inertial movements that impede the pull tab may, however, trigger the automatic deployment of the device/system.

The synchronized, multifocal emergency alert system 100 may utilize an identifier having a registered number to its owner. In the event that the identifier is activated, the emergency alert system 100 will send/e-mail the identifier via a signal over signal line 170 to an emergency communication center or tactical operations command or emergency operations command. The device 150 shall have a pre-staged power source to energize the system 100.

Figure 4:
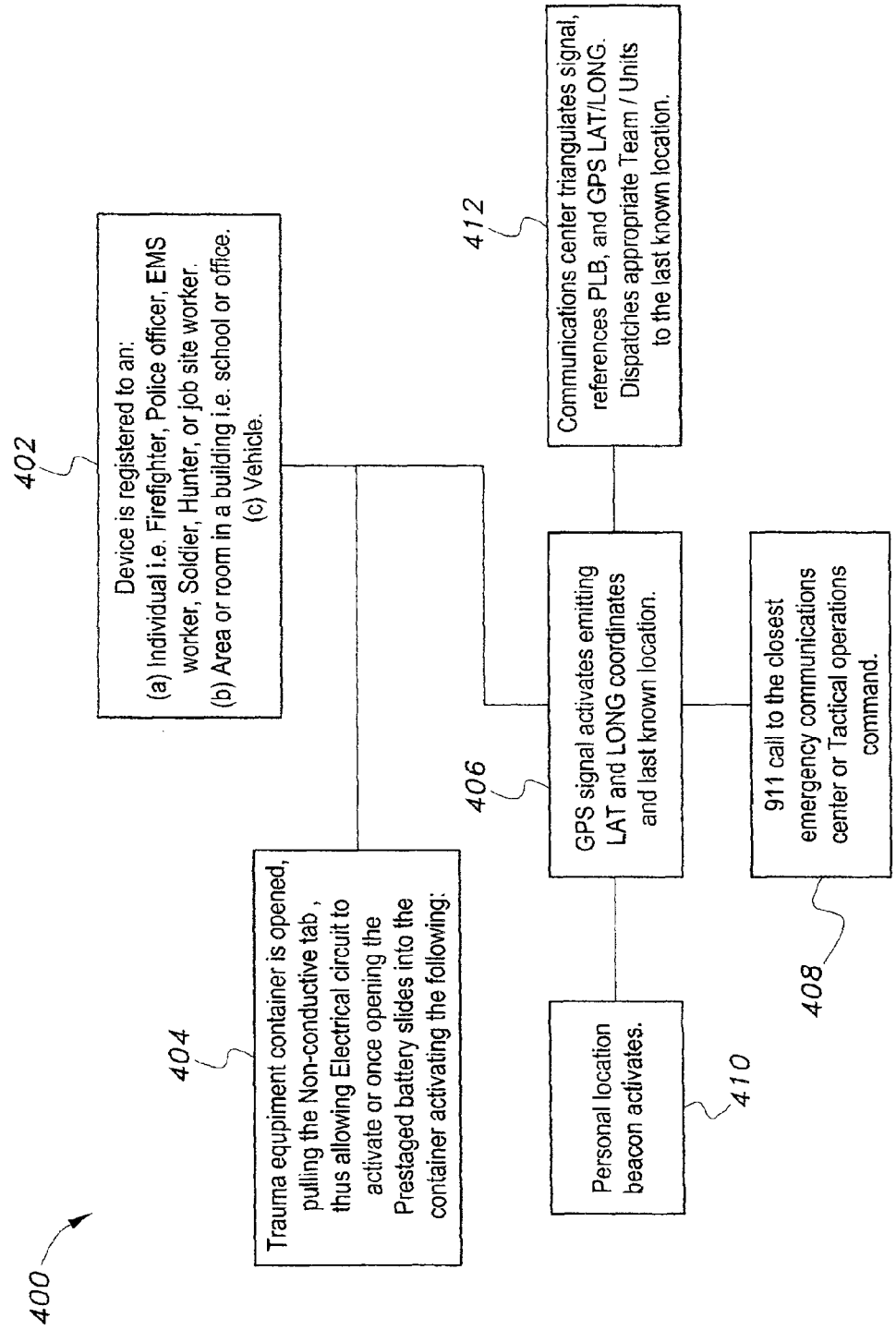
FIG. 4 is a flowchart of an emergency alert system according to the present invention.

As shown in FIG. 4, at step 402, the device 150 may be registered to an individual or a location. At step 404, when the container of the system 100 is opened, the battery-operated circuit sends an activation signal. In addition to the activation procedure shown in FIGS. 2A and 2B, a pre-staged battery may be positioned to slide into the container to complete the battery operated circuit, thereby activating the device 150. At step 406, the activation signal may activate a GPS signal emitting present coordinates and last known location. At step 410, a personal location beacon activates. At step 412, a communications center triangulates the signal, references a personal locator beacon (PLB) and/or GPS lat/long, and dispatches a response team as appropriate. At step 408, a 911 call to a closest emergency communications center is initiated.

It is to be understood that the present invention is not limited to the embodiments described above, but encompasses any and all embodiments within the scope of the following claims.

I claim:

1. A synchronized, multifocal emergency alert system, comprising:
   a device/emergency kit container;
   a zipper track disposed on the emergency kit container;
   a zipper slider disposed on the zipper track for opening and closing the emergency kit container;
   a non-conductive pull tab connected to the zipper slider;
   an access tab disposed on the emergency kit container and connected to the non-conductive pull tab;
   an electronic device disposed inside the emergency kit container, wherein the electronic device is in synchronous electrical communication with a plurality of remote locations and entities;
   a battery operated circuit disposed inside the emergency kit container and operably connected to the electronic device;
   a spring-biased electrical switch included in the battery-operated circuit, the spring biased electrical switch energizing the electronic device when the spring-biased electrical switch is closed, the non-conductive pull tab being disposed between a switch pole and a switch throw arm of the switch, thereby keeping the electrical switch open until the non-conductive pull tab is pulled; and
   wherein when the access tab is pulled and the zipper is slid along the zipper track, the non-conductive pull tab is removed from between the switch pole and switch throw arm, the switch throw arm being spring-biased to close the switch, thereby completing the battery-operated circuit to activate the electronic device.

2. The synchronized, multifocal emergency alert system according to claim 1, further comprising a signal line forming an output of the electronic device, the signal line allowing a signal to be transmitted from the electronic device to the plurality of remote locations and entities.

3. The synchronized, multifocal emergency alert system according to claim 2, wherein the signal transmitted from the electronic device is a hard-wired signal.

4. The synchronized, multifocal emergency alert system according to claim 2, wherein the signal transmitted from the electronic device is a wireless signal.

5. The synchronized, multifocal emergency alert system according to claim 2, wherein the signal transmitted from the electronic device is a wireless signal including identifying information about the location of the emergency.

6. A synchronized multifocal emergency alert system, comprising:
   a compartment attached to a portable accessory, the compartment having an access opening and an actuator for opening and closing the access opening;
   an alert device disposed in the compartment, the alert device having a circuit including a power source, a spring-biased electrical switch having contacts, and a transmitting circuit configured for transmitting a synchronous multifocal alert signal when power is applied from the power source to the transmitting circuit; and
   a pull tab connected between the actuator and the electrical switch, the pull tab being disposed between the electrical switch contacts to maintain the electrical switch in an open position when the access opening to the compartment is closed, thereby disconnecting power from the power source to the transmitting circuit, the pull tab being pulled from between the electrical switch contacts when the actuator opens the access opening in the compartment, thereby closing the electrical switch and applying power to the transmitting circuit to transmit the synchronous multifocal alert signal.

7. A synchronized multifocal emergency alert system, comprising:
- a compartment attached to a portable accessory, the compartment having an access opening and an actuator for opening and closing the access opening;
- an alert device disposed in the compartment, the alert device having a circuit including a power source, a spring-biased electrical switch having contacts, and a transmitting circuit configured for transmitting a multifocal alert signal when power is applied from the power source to the transmitting circuit; and
- a sensor, the sensor being in electrical communication with the spring-biased electrical switch, wherein the sensor is equipped with a predetermined threshold event and is adapted to automatically trigger the spring-biased electrical switch whenever the predetermined threshold event is exceeded thereby transmitting the synchronous multifocal alert signal.

8. The synchronized, multifocal emergency alert system according to claim 7, wherein said synchronous multifocal alert signal comprises a beacon capable of being triangulated to determine location of the compartment.

9. The synchronized, multifocal emergency alert system according to claim 7, wherein said alert device further comprises a GPS receiver, said transmitting circuit being configured for transmitting geographic coordinates determined by the GPS receiver in the synchronous multifocal alert signal.

* * * * *